Feb. 1, 1966

E. P. BUSILLO 3,232,107

FLOWMETER

Filed Aug. 24, 1962

INVENTOR.
EUGENE P. BUSILLO
BY

ATTORNEYS

United States Patent Office

3,232,107
Patented Feb. 1, 1966

3,232,107
FLOWMETER
Eugene P. Busillo, Huntingdon Valley, Pa., assignor to Fischer & Porter Company, Warminster, Pa., a corporation of Pennsylvania
Filed Aug. 24, 1962, Ser. No. 219,170
7 Claims. (Cl. 73—209)

This invention relates to flowmeters of the variable area type, and particularly to an assembly having various advantages.

Heretofore it has been customary to provide such flowmeters in the form of supporting frames, generally of metal, containing pipe fitting end assemblies for connection to inlet and outlet conduits, the metering tube, generally of glass, being mounted between tubular elements forming parts of the end assemblies, generally with provisions for ready removability of the metering tube for cleaning and replacement. In such flowmeters there was generally required a protective shield at least partially transparent so that the tube could be viewed for observation of the position of its float.

The general object of the present invention is the provision of a variable area flowmeter involving an assembly of simple parts utilizing O-rings for packing.

One aspect of the present invention involves the provision of a body in the form of a simple extrusion of a transparent plastic as the major element of the assembly. In accordance with the invention end tube-mounting elements are provided to fit into the extrusion and provide nipples for the mounting of the metering tube. Provision for inlet and outlet flows is made through the use of generally cylindrical members which additionally function as pins for maintaining the end elements in position. These members, in turn, are held in position by spring clips. Disassembly and reassembly may be effected without detaching these members from the piping.

The resulting structure is very readily assembled and disassembled without the use of any special tools. While the invention is particularly applicable to small flowmeters such as may be used in laboratories, it will become evident that the invention is applicable to flowmeters of larger sizes.

The attainment of the general objects of the invention together with subsidiary objects relating to details of construction will become apparent from the following description read in conjunction with the accompanying drawing in which.

The body 2 of the meter is formed of an extrusion of a transparent plastic such as methyl methacrylate, through other plastic materials may be used. As will be evident, the extrusion may be provided in the form of a long rod and portions may be cut off of suitable lengths for particular flowmeters, the lengths corresponding to those of the variable area metering tubes to be used. While the cross-sectional shape of the body 2 is obviously rather arbitrary, it is shown herein as of square cross-section both internally and externally.

Figure 1:
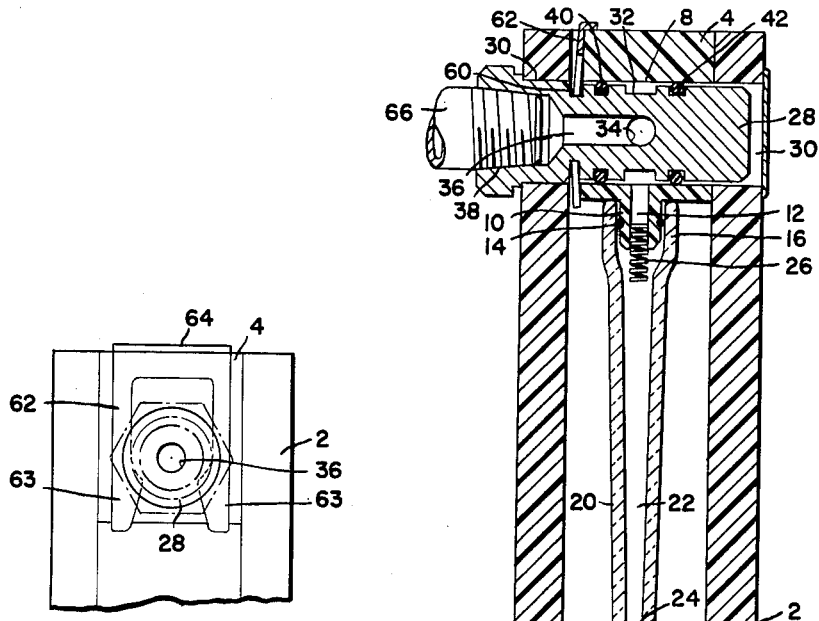
FIGURE 1 is a vertical section through a flowmeter assembly provided in accordance with the invention.
Figure 2:
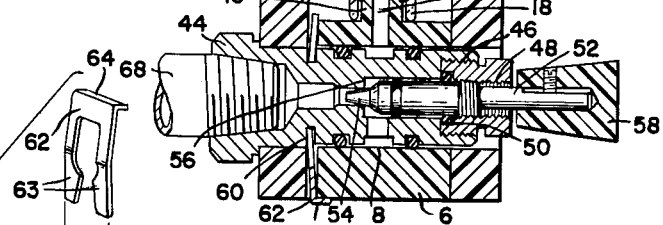
FIGURE 2 is a fragmentary elevation looking at the upper left of FIGURE 1.

Arranged for location within the ends of the body 2 are elements 4 and 6 which may also be formed of a plastic material, desirably one which is readily machined. Transparency of this material is not important. The elements 4 and 6 desirably enter the body 2 with a sliding fit, though the external dimension as viewed transversely in FIGURE 1 is somewhat less than the internal dimension of the body 2 to provide for the reception of spring clips as hereafter described. Since the upper and lower members 4 and 6 are similar, and in fact in many instances may be identical, their characteristic structures are designated by the same reference numerals.

Each is provided with a cylindrical bore 8 and with a nipple portion 10 provided with a central bore 12. These nipples extend inwardly and are provided with circumferential grooves for the reception of O-rings 14 over which there may be slipped for fluid tight engagement the end portions 16 and 18 of a metering tube 20 provided with the usual tapered bore 22 within which may move the float 24 which, in small size flowmeters, may take the form of a stainless steel or similar sphere. The flowmeter tube 20 is of conventional type and is provided with the usual graduations (not shown). More elaborate floats may be provided for special purposes as is well known in the art, and flow measurement is accomplished in the usual fashion by observation of the position of the float relative to the tube graduations.

The upper bore 12 may receive frictionally a spring 26 to serve as a resilient stop for the float and prevent closing off of the passage in the case of rates of flow exceeding those intended to be measured.

Reference may now be made particularly to the plug 28 at the top of the flowmeter. This may be machined from hexagonal stock of stainless steel, plastic or other material to provide a cylindrical plug portion which will pass freely through the bore 8 of the member 4 and through and into aligned cylindrical openings 30 in the body 2. An annular groove 32 provides communication with the bore 12 and in turn communicates through a radial passage 34 with an axial passage 36 communicating with a tapped opening 38 for reception of a pipe or tube connection. The connecting arrangement is, of course, arbitrary depending upon the desired use of the meter, various types of connecting joints being usable.

The annular groove 32 is flanked by circumferential grooves for the reception of O-rings 40 and 42 providing fluid tight engagement with the bore 8 of the member 4. The plug 28 just described may be provided identically at the lower portion of the meter; but if it is desired to provide a valve to control the flow, the plug may be modified as illustrated at 44, being threaded at the end opposite the pipe connection as indicated at 46 for the reception of a gland 48 which holds an O-ring 50 bearing against a portion of the stem 52 of a valve provided with a tapered portions 54 engageable with a seat 56 which, in this case, is provided as part of the axial bore corresponding to 34. The needle valve arrangement thus provided is adjustable by the threaded mounting of the stem 52 through operation of the knob 58.

The plugs 28 and 44 are provided with annular grooves 60 arranged to cooperate with the bifurcated legs 63 of spring clips 62, the legs being subject to slight springing so that a snap engagement within the grooves 60 may be provided. The spring clips are desirably bent or sprung as indicated and are provided with turned head portions 64 under which a knife blade or the like may be inserted to pry them outwardly after assembly. The width of each of the spring clips is desirably such as to permit it to pass freely into the opening in the body 2.

Figure 3:
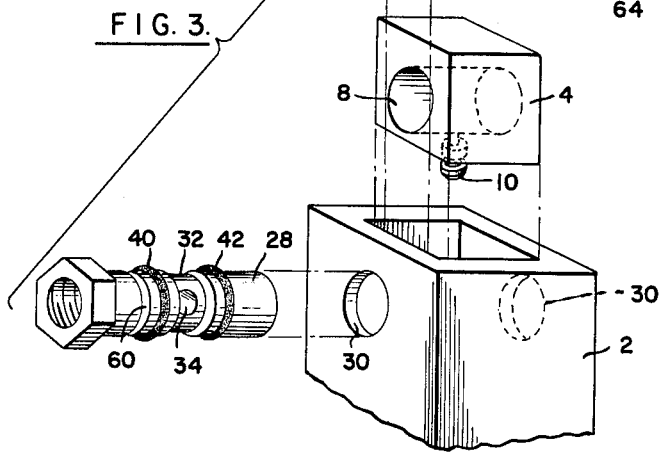
FIGURE 3 is an exploded view indicating the assembly of the various elements at the top portion of the meter.

Considering the disassembled parts, and referring particularly to FIGURE 3, it will be readily seen how an assembly is accomplished. The members 4 and 6 carrying their O-rings 14 may be inserted in the respective ends of the metering tube and this assembly may then be entered into the body 2 to bring the bores 8 into alignment with the openings 30. The plugs 28 and 44, already connected to the inlet and outlet pipes or tubes 66 and 68, and carrying their O-rings, may then be inserted into the bores 8 and openings 30 by moving the assembly there-over. Finally the spring clips 62 may be inserted and snapped into grooves 60 to complete the assembly. The inlet and outlet tubing may form the mounting for the meter if it is sufficiently rigid. Alternatively, however, bracket elements (not shown) may be held under the heads of the plugs 28 and 44 and clamped against the body 2, the clamping action being maintained by the spring clips.

The matter of disassembly is merely the reverse of the assembly, the spring clips being first removed by prying them outwardly, whereupon the other parts slip apart readily. Because of the use of O-rings, fluid tight packing is provided despite the otherwise loose fits, and so far as the metering tube is concerned the various O-rings provide sufficient resiliency to shield it against shocks which might otherwise result in breakage.

It will be evident from the foregoing that a flowmeter assembly is provided which is not only simple in construction and in assembly and disassembly but which is relatively inexpensive. Protection is afforded to the metering tube by the body 2 which, at the same time, provides free visibility for reading the indicated flow rates.

Because of the use of an extrusion to form the body, the same extrusion may be used for numerous sizes of flowmeters, lengths of the extrusion being cut off as desired. The bores 30 may be drilled in the desired locations, and assembly then made using the other parts which may be standardized for a large range of flowmeters.

If desired, of course, a side of the body 2 may be open for visibility of the metering tube, in which case the body may be of a non-transparent material such as plastic or, if desired, of an aluminum or other extrusion.

It will be evident that various details of construction may be provided without departing from the invention as defined in the following claims.

What is claimed is:

1. A flowmeter comprising an elongated body member having openings at its ends, supporting elements located in said openings and provided with coupling portions having axially extending passages therethrough, a meter assembly including a metering tube telescopically associated with said coupling portions with annular packing means between each coupling portion and a corresponding end of the metering tube, a pair of plug members, each inserted, in a direction perpendicular to the axis of said body member, through aligned openings in one of the supporting elements and a corresponding end of said body member to lock the supporting element against movement relative to the body member, a pair of spaced packing elements between each plug member and its corresponding supporting element defining a fluid space communicating with the axially extending passage of such supporting element, each of said plug members having a passage therein communicating with said fluid space, and means retaining said plugs in said body member and supporting elements.

2. A flowmeter comprising an elongated body member in the form of an extrusion having a uniform transverse cross-section and having openings at its ends, supporting elements located in said openings and provided with coupling portions having axially extending passages therethrough a meter assembly including a metering tube telescopically associated with said coupling portions with annular packing means between each coupling portion and a corresponding end of the metering tube, a pair of plug members, each inserted, in a direction perpendicular to the axis of said member through aligned openings in one of the supporting elements and a corresponding end of said body member to lock the supporting element against movement relative to the body member, a pair of spaced packing elements between each plug member and its corresponding supporting element defining a fluid space communicating with the axially extending passage of such supporting element, each of said plug members having a passage therein communicating with said fluid space, and means retaining said plugs in said body member and supporting elements.

3. A flowmeter comprising an elongated body member in the form of a plastic extrusion having a uniform transverse cross-section and having openings at its ends, supporting elements located in said openings and provided with coupling portions having axially extending passages therethrough, a meter assembly including a metering tube telescopically associated with said coupling portions with annular packing means between each coupling portion and a corresponding end of the metering tube, a pair of plug members, each inserted, in a direction perpendicular to the axis of said body member, through aligned openings in one of the supporting elements and a corresponding end of said body member to lock the supporting element against movement relative to the body member, a pair of spaced packing elements between each plug member and its corresponding supporting element defining a fluid space communicating with the axially extending passage of such supporting element, each of said plug members having a passage therein communicating with said fluid space, and means retaining said plugs in said body member and supporting elements.

4. A flowmeter comprising an elongated body member in the form of a transparent plastic extrusion having a uniform transverse cross-section and having openings as its ends, supporting elements located in said openings and provided with coupling portions having axially extending passages therethrough, a meter assembly including a metering tube telescopically associated with said coupling portions with annular packing means between each coupling portion and a corresponding end of the metering tube, a pair of plug members, each inserted, in a direction perpendicular to the axis of said body member, through aligned openings in one of the supporting elements and a corresponding end of said body member to lock the supporting element against movement relative to the body member, a pair of spaced packing elements between each plug member and its corresponding supporting element defining a fluid space communicating with the axially extending passage of such supporting element, each of said plug members having a passage therein communicating with said fluid space, and means retaining said plugs in said body member and supporting elements.

5. A flowmeter comprising an elongated body member having openings at its ends, supporting elements located in said openings and provided with coupling portions having axially extending passages therethrough, a meter assembly including a metering tube telescopically associated with said coupling portions with annular packing means between each coupling portion and a corresponding end of the metering tube, a pair of cylindrical plug members, each inserted, in a direction perpendicular to the axis of said body member, through aligned openings in one of the supporting elements and a corresponding end of said body member to lock the supporting element against movement relative to the body member, a pair of spaced packing elements in the form of O-rings between each plug member and its corresponding supporting element defining a fluid space communicating with the axially extending passage of such supporting element, each of said plug members having a passage therein communicating with said fluid space, and means retaining said plugs in said body member and supporting elements.

6. A flow meter comprising an elongated body member having openings at its ends, supporting elements located in said openings and provided with coupling portions having axially extending passages therethrough, a meter assembly including a metering tube telescopically associated with said couping portions with annular packing means between each coupling portion and a corresponding end of the metering tube, a pair of plug members, each inserted, in a direction perpendicular to the axis of said body member, through aligned openings in one of the supporting elements and a corresponding end of said body member to lock the supporting element against movement relative to the body member, a pair of spaced packing elements between each member and its corresponding supporting element defining a fluid space communicating with the axially extending passage of such supporting element, each of said plug members having a passage therein communicating with said fluid space, and means retaining said plugs in said body member and supporting elements, said retaining means being provided by spring clips receivable in the openings in the body member and yieldingly engaging said plug members.

7. A flowmeter comprising an elongated body member having openings at its ends supporting elements located in said openings and provided with coupling portions having axially extending passages therethrough, a meter assembly including a metering tube telescopically associated with said coupling portions with annular packing means between each coupling portion and a corresponding end of the metering tube, a pair of plug members, each inserted, in a direction perpendicular to the axis of said body member, through aligned openings in one of the supporting elements and a corresponding end of said body member to lock the supporting element against movement relative to the body member, a pair of spaced packing elements between each plug member and its corresponding supporting element defining a fluid space communicating with the axially extending passage of such supporting element, each of said plug members having a passage therein communicating with said fluid space, a valve in one of said plug members arranged to control flow through its passage, and means retaining said plugs in said body member and supporting elements.

References Cited by the Examiner
UNITED STATES PATENTS

| | | | |
|---|---|---|---|
| 2,655,041 | 10/1953 | Jacobsson | 73—209 X |
| 2,755,659 | 7/1956 | Boppel | 83—209 X |
| 3,060,738 | 10/1962 | Busillo | 73—209 |
| 3,133,440 | 5/1964 | Conkling | 73—209 |

FOREIGN PATENTS 596,605    4/1960    Canada.

RICHARD C. QUEISSER, *Primary Examiner.*